United States Patent
Oyabu et al.

(10) Patent No.: US 12,263,778 B2
(45) Date of Patent: Apr. 1, 2025

(54) BRACKET ATTACHMENT STRUCTURE

(71) Applicants: STANLEY ELECTRIC CO., LTD., Tokyo (JP); HONDA MOTOR CO., LTD., Tokyo (JP)

(72) Inventors: Yuuri Oyabu, Tokyo (JP); Masaki Ando, Tokyo (JP); Yuki Sasanuma, Tokyo (JP); Takato Watanabe, Tokyo (JP); Keishi Shiomi, Tokyo (JP)

(73) Assignees: STANLEY ELECTRIC CO., LTD., Tokyo (JP); HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 18/785,958

(22) Filed: Jul. 26, 2024

(65) Prior Publication Data

US 2025/0033555 A1 Jan. 30, 2025

(51) Int. Cl.
*B60Q 1/00* (2006.01)
(52) U.S. Cl.
CPC .................. *B60Q 1/0023* (2013.01)
(58) Field of Classification Search
CPC .................................................. B60Q 1/0023
See application file for complete search history.

(56) References Cited

U.S. PATENT DOCUMENTS

2023/0139713 A1* 5/2023 Watanabe ............... F21S 41/28
342/22

FOREIGN PATENT DOCUMENTS

JP 2022-001451 A 1/2022

* cited by examiner

*Primary Examiner* — Robert J May
(74) *Attorney, Agent, or Firm* — Kenealy Vaidya LLP (57) ABSTRACT

Provided is a bracket attachment structure for detachably attaching a bracket to which a radar unit is attached to an outer lens. In the bracket attachment structure, the outer lens is attached to a lamp housing and constitutes a lamp chamber in which a lamp unit is disposed between the outer lens and the lamp housing, the outer lens includes a recessed part, the bracket includes a bracket main body disposed in the recessed part and an extension part extending from an other end side on a side opposite to one end side of the bracket main body to the outside of the recessed part and detachably fixed to an attachment partner, a restricting part is provided on a bottom surface of the recessed part, and a fitting recessed part into which the restricting part is inserted and fitted is provided in the bracket main body.

6 Claims, 11 Drawing Sheets

BRACKET ATTACHMENT STRUCTURE

INCORPORATION BY REFERENCE

This application is based upon and claims the benefit of priority from Japanese patent application No. 2023-123024, filed on Jul. 28, 2023, the disclosure of which is incorporated herein in its entirety by reference.

BACKGROUND

The present disclosure relates to a bracket attachment structure for detachably attaching a bracket to which a radar unit is attached to an outer lens.

Patent Literature 1 describes a bracket attachment structure in which a bracket (support member) to which a radar unit is attached is detachably attached to a housing (in particular, refer to FIG. 2 of Patent Literature 1). The radar unit is used to detect an object by transmitting a high-frequency electromagnetic wave (for example, millimeter waves) around the vehicle and receiving a reflected wave from the object present within a transmission range.

Patent Literature 1: Japanese Unexamined Patent Application Publication No. 2022-001451.

SUMMARY

However, Patent Literature 1 does not describe or suggest a bracket attachment structure for detachably attaching the bracket (support member) to which the radar unit is attached to the outer lens (recessed part recessed toward a housing side), and there is room for improvement.

The present disclosure has been made to solve such a problem, and an example object thereof is to provide a bracket attachment structure for detachably attaching a bracket to which a radar unit is attached to an outer lens.

In an example aspect, a bracket attachment structure according to the present disclosure is a bracket attachment structure that detachably attaches a bracket to an outer lens that is attached to a lamp housing and constitutes a lamp chamber in which a lamp unit is disposed between the outer lens and the lamp housing, the outer lens includes a recessed part recessed toward the lamp housing side, the bracket includes a bracket main body including a front surface to which a radar unit is detachably attached and a rear surface on a side opposite to a the front surface, the bracket main body being disposed in the recessed part in a state where the rear surface and a bottom surface of the recessed part face each other, and an extension part extending from an other end side on a side opposite to one end side of the bracket main body to an outside of the recessed part and detachably fixed to an attachment partner, an engaged part is provided in one of an inner wall of the recessed part and one end side of the bracket main body, an engaging part that engages with the engaged part is provided in the other of the inner wall of the recessed part and one end side of the bracket main body, one of a bottom surface of the recessed part of the outer lens and the bracket main body is provided with a restricting part protruding toward the other, a fitting recessed part into which the restricting part is inserted and fitted is provided in the other of the bottom surface of the recessed part of the outer lens and the bracket main body, and the bracket is fixed to the outer lens in a state where the engaging part is engaged with the engaged part, the extension part is fixed to the attachment partner, and the restricting part is inserted into and fitted in the fitting recessed part.

With such a configuration, it is possible to provide the bracket attachment structure in which the bracket to which the radar unit is attached is detachably attached to the outer lens.

According to this bracket attachment structure, the bracket can be detachably attached to the outer lens (recessed part recessed toward the housing side) by the engaging part engaging with the engaged part and the extension part being fixed to the attachment partner. At that time, the restricting part is inserted and fitted into the fitting recessed part. As a result, since the movement of the bracket in an up-down direction and a left-right direction is restricted, the bracket can be stably attached to the outer lens (recessed part). As a result, it is possible to realize the bracket attachment structure in which a positional shift of the bracket with respect to the outer lens is less likely to occur even when vibration (vibration mainly during running of vehicle) is applied, that is, unintended movement of up, down, left, and right can be suppressed.

In the bracket attachment structure, the restricting part may include a pair of upper restricting surface and lower restricting surface, the fitting recessed part may include an upper surface in surface contact with the upper restricting surface and a lower surface in surface contact with the lower restricting surface, and the bracket may be restricted from moving in an up-down direction by bringing the upper surface of the fitting recessed part into surface contact with the upper restricting surface of the restricting part and bringing the lower surface of the fitting recessed part into surface contact with the lower restricting surface of the restricting part in a state where the restricting part is inserted and fitted into the fitting recessed part.

In the bracket attachment structure, the restricting part may further include a pair of left restricting surface and right restricting surface, the fitting recessed part may further include a left surface in surface contact with the left restricting surface and a right surface in surface contact with the right restricting surface, and the bracket may be restricted from moving in a left-right direction by bringing the left surface of the fitting recessed part into surface contact with the left restricting surface of the restricting part and bringing the right surface of the fitting recessed part into surface contact with the right restricting surface of the restricting part in a state where the restricting part is inserted and fitted into the fitting recessed part.

In the bracket attachment structure, the restricting part may be inserted into the fitting recessed part and fitted into the fitting recessed part by the engaging part engaging with the engaged part and the bracket rotating toward the outer lens with the engaged engaging part used as a fulcrum.

Further, in the bracket attachment structure, either of the upper restricting surface and the lower restricting surface, whichever is a surface close to the engaging part, is configured as an inclined surface so as to be easily inserted into the fitting recessed part during the rotation of the bracket.

In the bracket attachment structure, the engaged part may be a groove, and the engaging part may be a protruding part to be inserted into the groove.

According to the present disclosure, it is possible to provide the bracket attachment structure in which the bracket to which the radar unit is attached is detachably attached to the outer lens.

The above and other objects, features and advantages of the present disclosure will become more fully understood from the detailed description given hereinbelow and the accompanying drawings.

DESCRIPTION OF EMBODIMENTS

Hereinafter, a vehicle lamp to which a bracket attachment structure according to an embodiment of the present disclosure is applied will be described with reference to the accompanying drawings. In the drawings, corresponding components are denoted by the same reference numerals, and repeated descriptions are omitted.

The vehicle lamp fitting 10 of the present embodiment is a vehicle lamp functioning as a headlamp, and is mounted on both left and right sides of a front end of a vehicle (not illustrated) such as an automobile. Since the vehicle lamp fitting 10 mounted on both the left and right sides has a symmetrical configuration, the vehicle lamp fitting 10 mounted on the left side (the left side when viewed from the front of the vehicle) of the front end of the vehicle will be described below as a representative.

Figure 1:
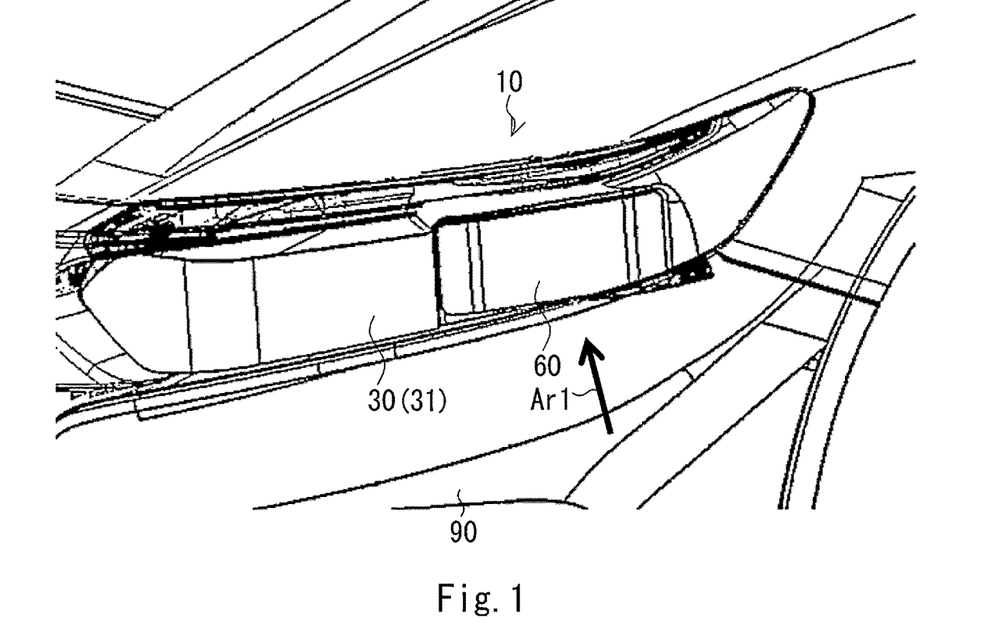
FIG. 1 is a perspective view of the vicinity of a vehicle lamp fitting 10 mounted on a vehicle.
Figure 2:
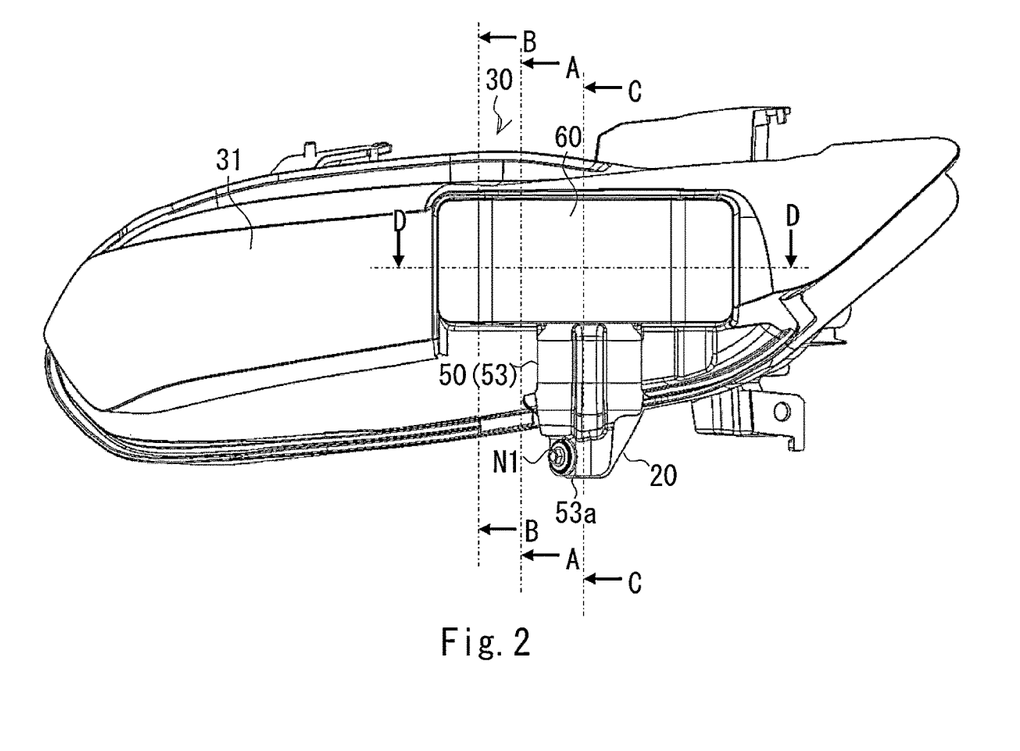
FIG. 2 is a view as viewed in a direction of an arrow Ar1 in FIG. 1.
Figure 3:
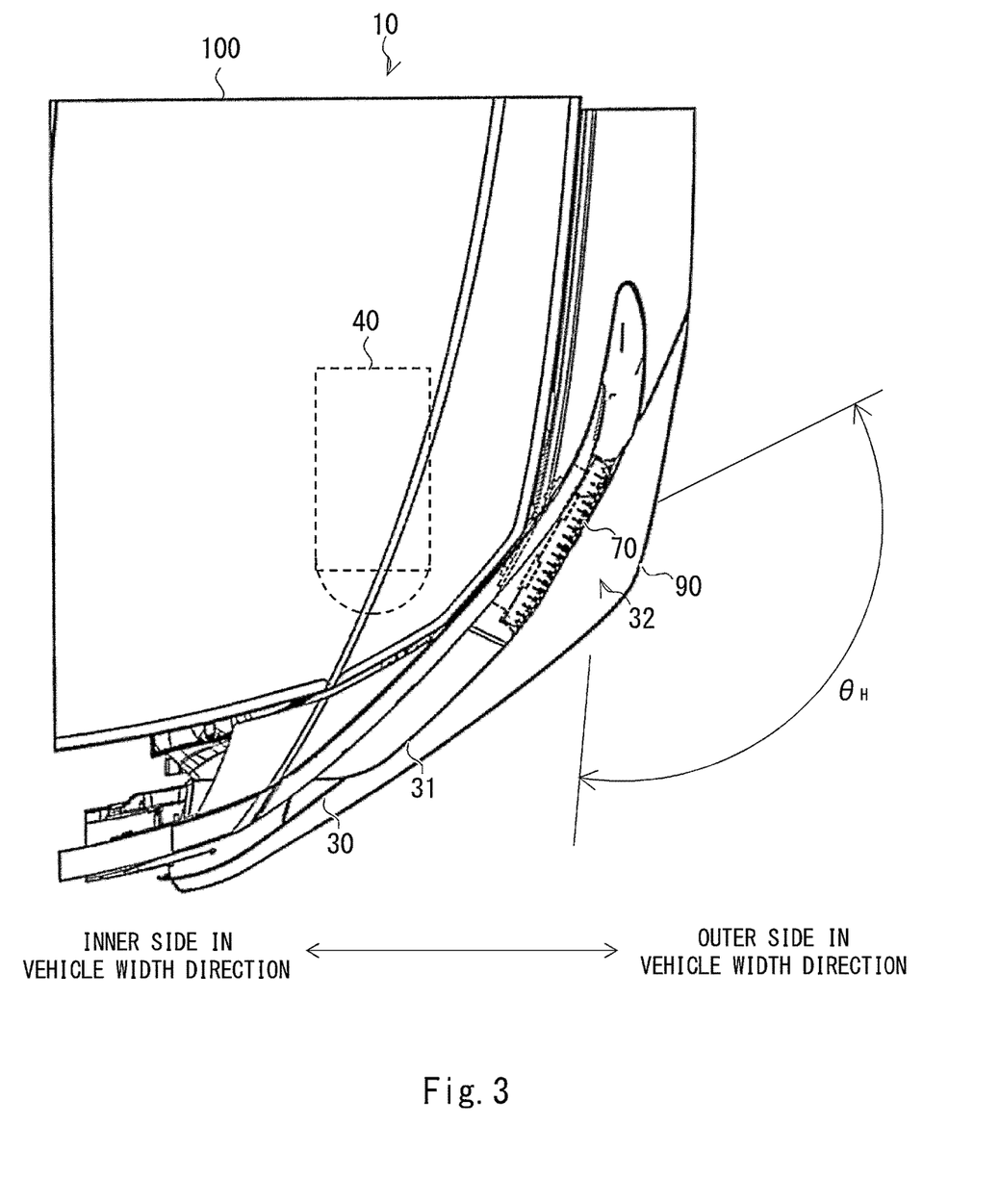
FIG. 3 is a top view of the vehicle lamp fitting 10.
Figure 4:
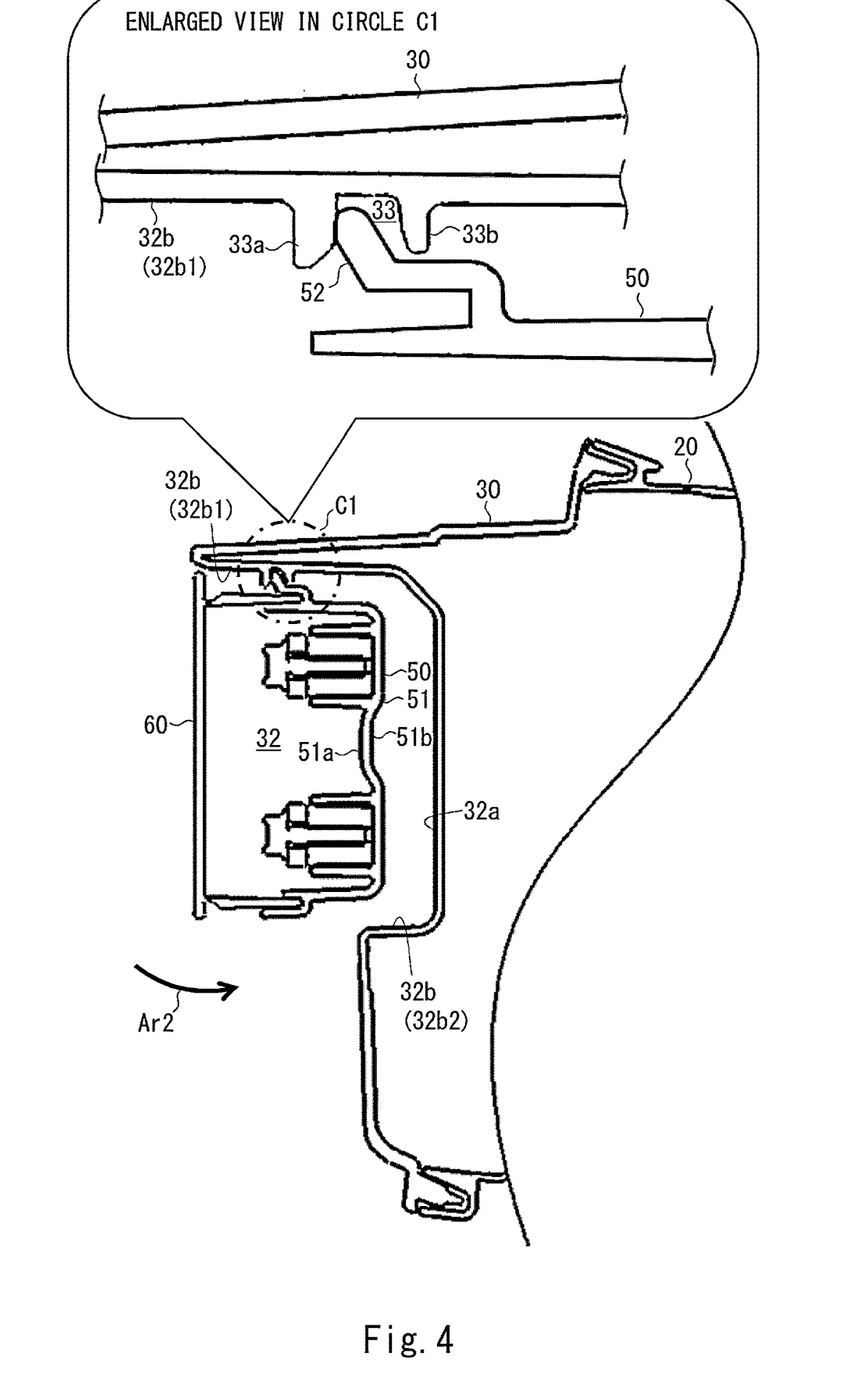
FIG. 4 is a cross-sectional view taken along line A-A of FIG. 2.
Figure 5:
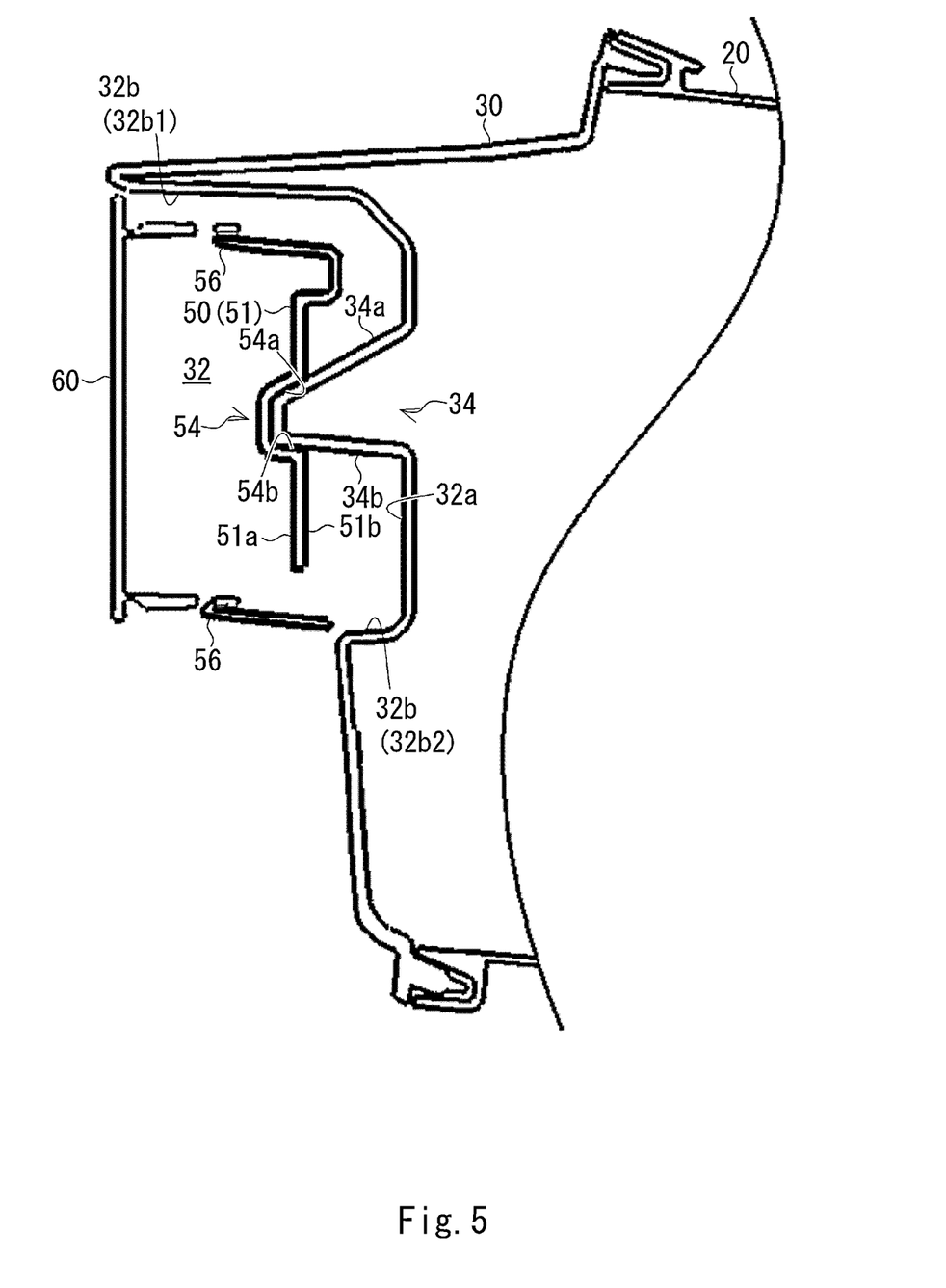
FIG. 5 is a cross-sectional view taken along line B-B of FIG. 2.
Figure 6:
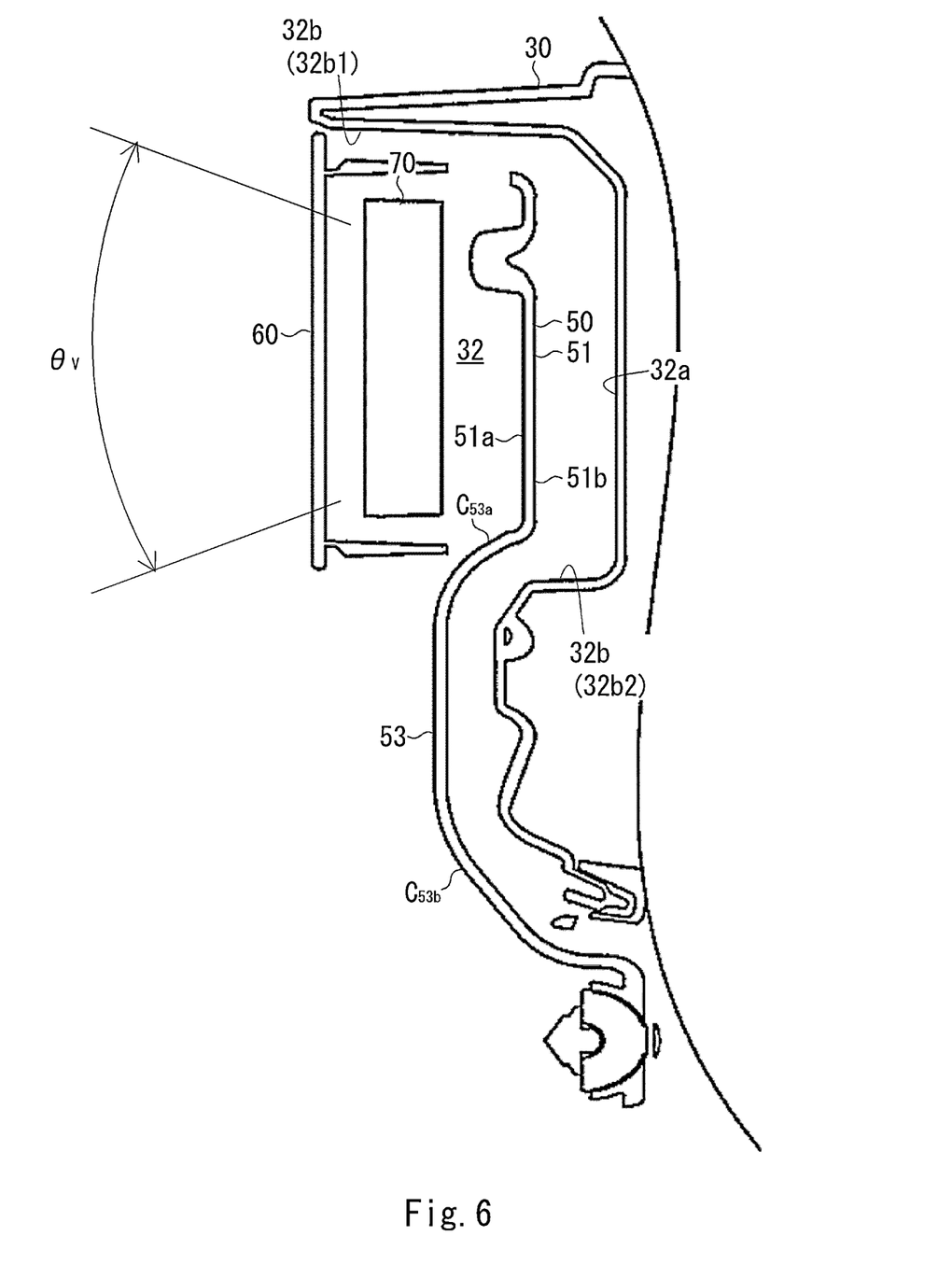
FIG. 6 is a cross-sectional view taken along line C-C of FIG. 2.
Figure 7:
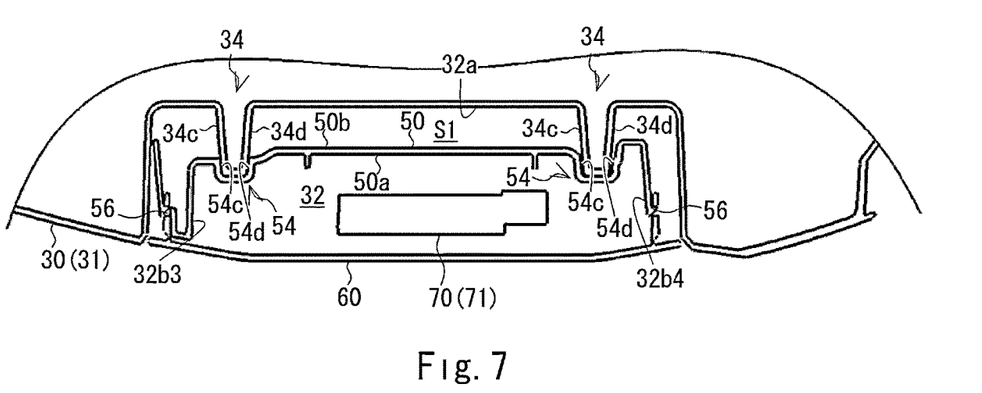
FIG. 7 is a cross-sectional view taken along line D-D of FIG. 2.

FIG. 1 is a perspective view of the vicinity of the vehicle lamp fitting 10 mounted on the vehicle, FIG. 2 is a view as viewed from a direction of an arrow Ar1 in FIG. 1, FIG. 3 is a top view of the vehicle lamp fitting 10, FIG. 4 is a cross-sectional view taken along line A-A of FIG. 2, FIG. 5 is a cross-sectional view taken along line B-B of FIG. 2, FIG. 6 is a cross-sectional view taken along line C-C of FIG. 2, and FIG. 7 is a cross-sectional view taken along line D-D of FIG. 2.

As illustrated in FIGS. 3 to 7, the vehicle lamp fitting 10 includes a lamp housing 20 (see FIG. 5), an outer lens 30, a lamp unit 40, a bracket 50, a radar cover 60, and a radar unit 70. Note that a reference numeral 90 in FIGS. 1 and 3 represents a bumper. A reference numeral 100 in FIG. 3 represents a vehicle body.

The outer lens 30 is attached to the lamp housing 20, and constitutes a lamp chamber in which the lamp unit 40 is arranged between the outer lens and the lamp housing 20. The lamp unit 40 may have any configuration as long as it is a lamp unit that emits light functioning as a headlamp. For example, the lamp unit 40 may be a projector type lamp unit, a reflector type lamp unit, a direct projection type (direct type) lamp unit, a lamp unit using a light guide body (light guide rod, light guide plate), or may be a lamp unit other than these.

Figure 8:
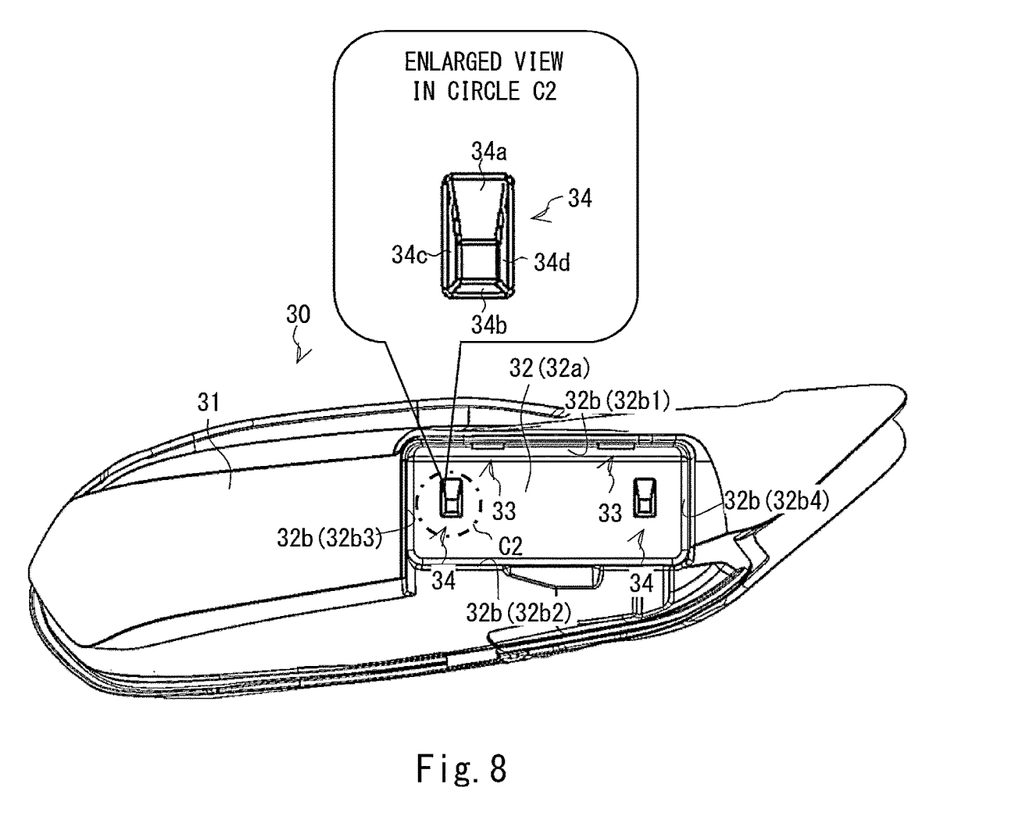
FIG. 8 is a front view of an outer lens 30.

FIG. 8 is a front view of the outer lens 30.

The outer lens 30 is made of a transparent resin (synthetic resin) such as acrylic or polycarbonate, and includes, as illustrated in FIGS. 4 and 8, a lens part 31 through which light emitted from the lamp unit 40 passes, a recessed part 32 recessed from the front side toward the rear side (lamp housing 20 side), and a groove 33 (see an enlarged view in a circle C1 in FIG. 4) formed in an inner wall 32b (upper inner wall 32b1) of the recessed part 32. The groove 33 is an example of an engaged part of the present disclosure.

The lens part 31 is disposed at an inner side in a vehicle width direction, and the recessed part 32 is disposed at an outer side in the vehicle width direction (see FIG. 3). The recessed part 32 includes a bottom surface 32a on the rear side and an inner wall 32b (upper inner wall 32b1, lower inner wall 32b2, inner inner wall 32b3, and outer inner wall 32b4) (see FIGS. 4 to 8).

Figure 9:
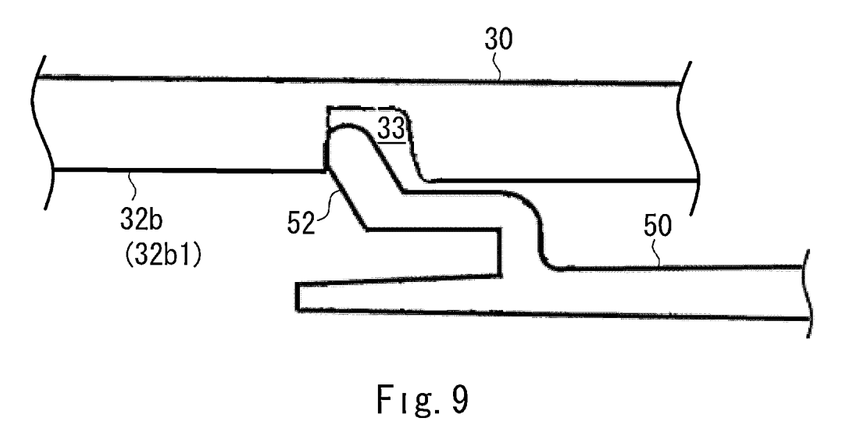
FIG. 9 is a modified example of a groove 33.

The groove 33 is a groove into which a protruding part 52 provided on the upper side of the bracket 50 (bracket main body 51) is inserted. The groove 33 (at two locations) is formed in the upper inner wall 32b1 of the recessed part 32 (see FIG. 8). Specifically, the groove 33 is formed between the first protruding part 33a on the front surface side and the second protruding part 33b on the rear surface side protruding from the upper inner wall 32b1 (see an enlarged view in a circle C1 in FIG. 4). The groove 33 extends in a direction orthogonal to the paper surface in FIG. 4. As illustrated in FIG. 9, the groove 33 may be formed directly on the inner wall 32b (upper inner wall 32b1) of the recessed part 32. FIG. 9 illustrates a modified example of the groove 33.

The bottom surface 32a of the recessed part 32 of the outer lens 30 is provided with restricting parts 34 (two locations) protruding toward the bracket 50 (See FIGS. 5, 7, and 8).

The restricting part 34 is a portion having a quadrangular frustum shape including a pair of upper restricting surface 34a and lower restricting surfaces 34b, and a pair of left restricting surfaces 34c and right restricting surfaces 34d (see FIGS. 5 and 7 and enlarged view of circle C2 in FIG. 8). The restricting part 34 is not limited to the quadrangular frustum shape, and may be a portion having a truncated cone shape, a polygonal frustum shape, or other shapes.

In the restricting part 34, in a state where the restricting part 34 is inserted into and fitted in a fitting recessed part 54 formed in the bracket 50 (bracket main body 51) (see FIG. 5), the upper surface 54a of the fitting recessed part 54 comes into surface contact with the upper restricting surface 34a of the restricting part 34, and the lower surface 54b of the fitting recessed part 54 comes into surface contact with the lower restricting surface 34b of the restricting part 34. As a result, the movement of the bracket 50 in an up-down direction is restricted. In the restricting part 34, in a state where the restricting part 34 is inserted into and fitted in the fitting recessed part 54 formed in the bracket 50 (the bracket main body 51) (see FIG. 7), a left surface 54c of the fitting recessed part 54 comes into surface contact with the left restricting surface 34c of the restricting part 34, and the right surface 54d of the fitting recessed part 54 comes into surface contact with the right restricting surface 34d of the restricting part 34. As a result, the movement of the bracket 50 in the left-right direction is restricted.

Next, the bracket 50 will be described.

Figure 10A:
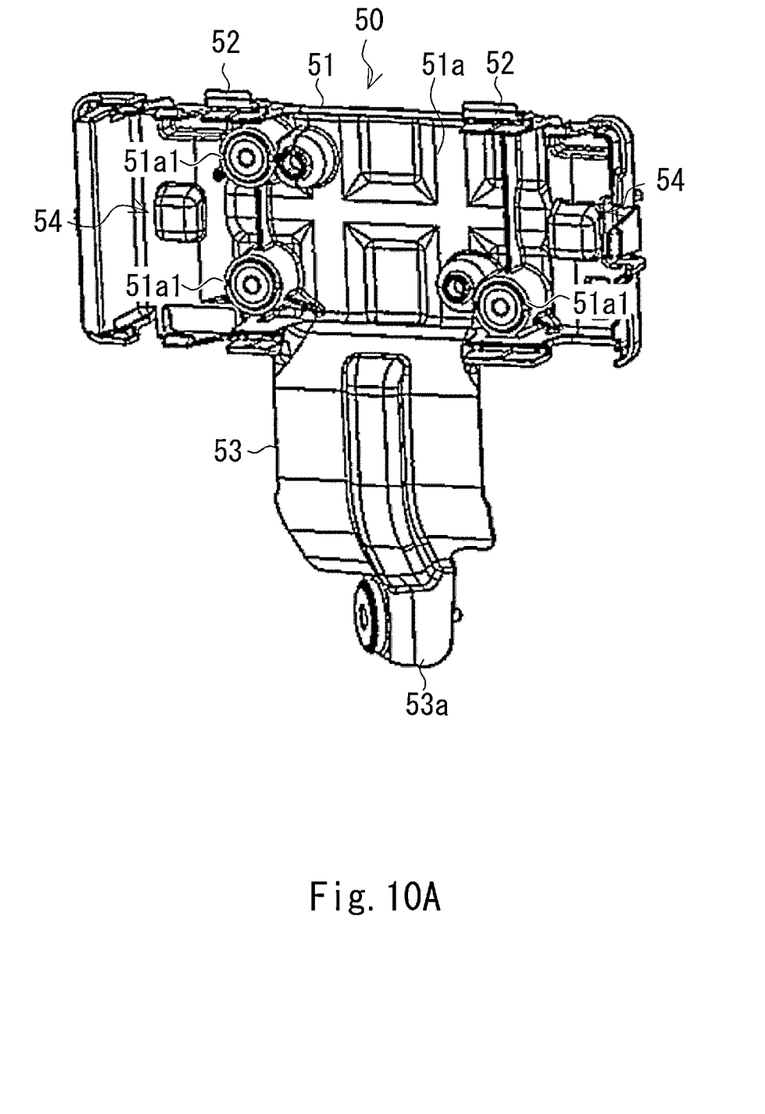
FIG. 10A is a perspective view of a bracket 50 as viewed from a front side.
Figure 10B:
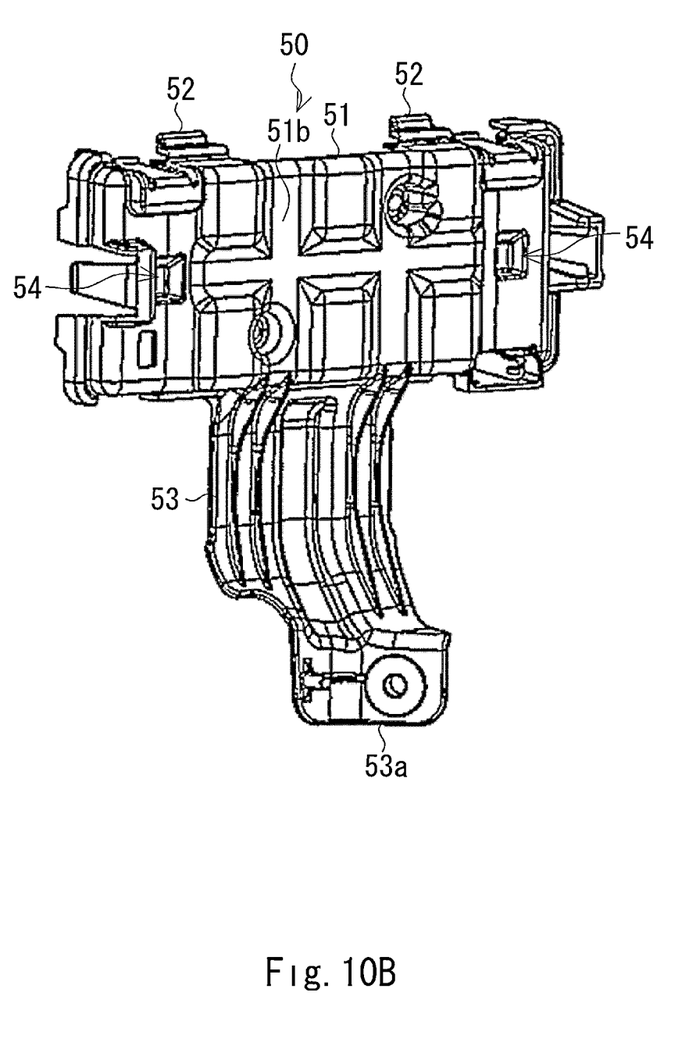
FIG. 10B is a perspective view of the bracket 50 as viewed from a rear side.

FIG. 10A is a perspective view of the bracket 50 as viewed from the front side, and FIG. 10B is a perspective view as viewed from the rear side.

As illustrated in FIGS. 10A and 10B, the bracket 50 includes a bracket main body 51, a protruding part 52, and an extension part (leg part) 53. The bracket 50 is integrally molded with a synthetic resin such as polycarbonate (PC), polybutylene terephthalate (PBT), or polyoxymethylene (POS).

The bracket main body 51 includes a radar unit attachment surface 51a (front surface) and a rear surface 51b on a side opposite to the front surface. The radar unit attachment surface 51a is provided with screw bosses 51a*l* (three locations) to which the radar unit 70 is screwed (see FIG. 10A and the like). The bracket main body 51 is provided with a fitting recessed part 54 into which the restricting part 34 (distal end) provided on the bottom surface 32a of the recessed part 32 of the outer lens 30 is inserted and fitted (see FIGS. 5, 7, and 10B). The fitting recessed part 54 is a quadrangular frustum shaped recessed part including an upper surface 54a and a lower surface 54b (see FIG. 5) corresponding to the upper restricting surface 34a and the lower restricting surface 34b, and a left surface 54c and a right surface 54d (see FIG. 7) corresponding to the left restricting surface 34c and the right restricting surface 34d. The fitting recessed part 54 only needs to be a recessed part into which the restricting part 34 is inserted and fitted, and is not limited to a quadrangular frustum shape, and may be a recessed part having a truncated cone shape, a polygonal frustum shape, or other shapes.

The protruding parts 52 (two locations) are provided on the upper portion side of the bracket main body 51 (an example of one end side of the present disclosure) corresponding to the grooves 33 (two locations) formed on the inner wall 32b (upper inner wall 32b1) of the recessed part 32 (see FIG. 10A and the like). The protruding part 52 is an example of an engaging part of the present disclosure.

The extension part 53 is provided on a lower side (an example of the other end side of the present disclosure) opposite to the upper side of the bracket main body 51. As illustrated in FIG. 6, the extension part 53 extends downward from the lower side of the bracket main body 51 via the first curved part C53a, further extends downward via the second curved part C53b, and is detachably fixed to an attachment partner (here, the lamp housing 20) outside the recessed part 32 (for example, fixed by a bolt N1 and see FIG. 2). The attachment partner is not limited to the lamp housing 20, and may be the outer lens 30.

Figure 11:
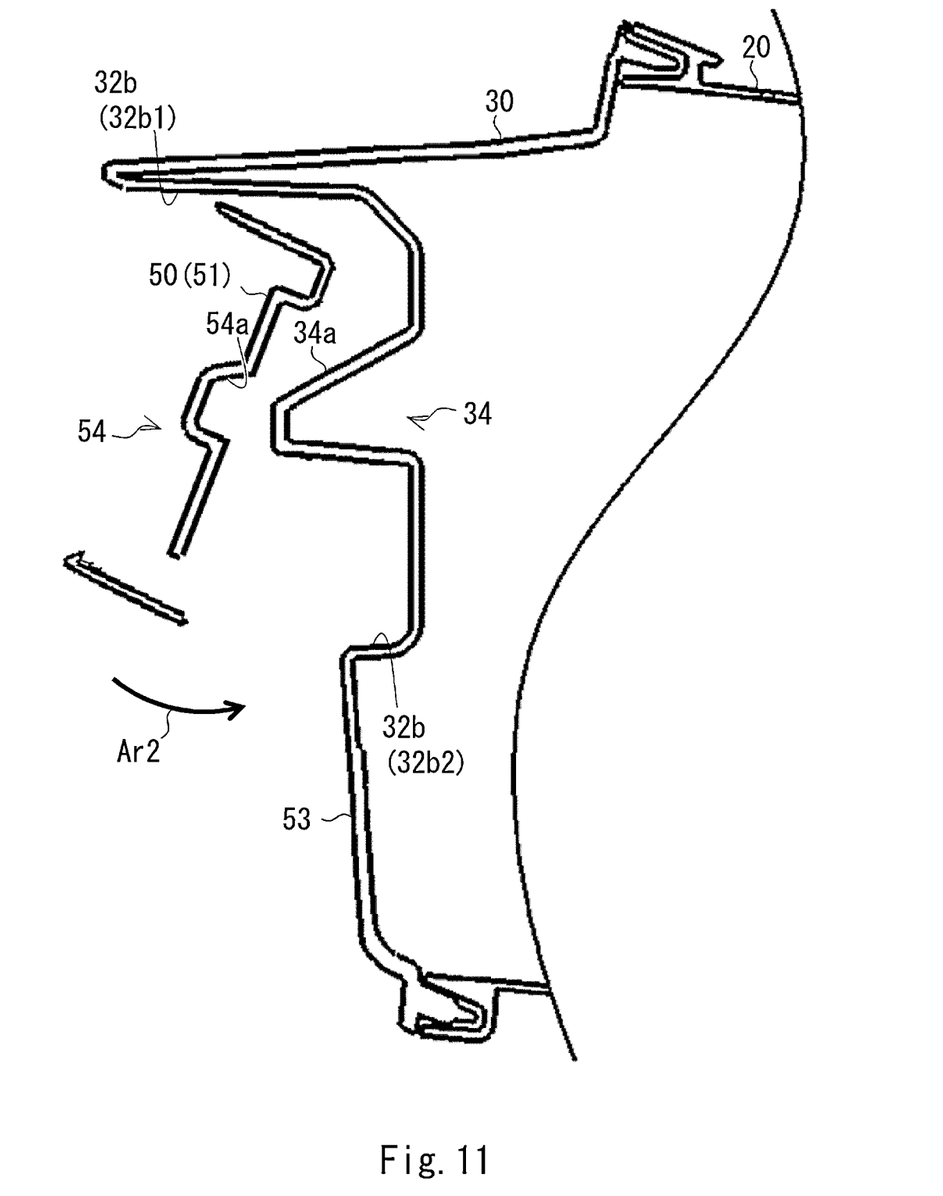
FIG. 11 is a view illustrating a state in which the bracket 50 is attached to the outer lens 30 (recessed part 32)

FIG. 11 is a view illustrating a state in which the bracket 50 is attached to the outer lens 30 (recessed part 32).

The bracket 50 having the above configuration is detachably attached to the outer lens 30 (recessed part 32). Specifically, first, in a state where the rear surface of the bracket 50 and the bottom surface 32a of the recessed part 32 of the outer lens 30 face each other, the protruding part 52 formed on the upper side of the bracket main body 51 is inserted into and engaged with the groove 33 formed in the inner wall 32b (upper inner wall 32b1) of the recessed part 32 (see an enlarged view in a circle C1 in FIG. 4).

Next, by rotating the bracket 50 toward the outer lens 30 side (see arrow Ar2 in FIG. 11) with the inserted and engaged protruding part 52 as a fulcrum, the restricting part 34 is inserted into the fitting recessed part 54 (See FIGS. 5 and 7). At this time, since the upper restricting surface 34a of the restricting part 34 and the upper surface 54a of the fitting recessed part 54 corresponding thereto are each configured as an inclined surface (see FIG. 11 and the like), the restricting part 34 can be inserted into the fitting recessed part 54 without interference between the restricting part 34 and the fitting recessed part 54. In addition, since the upper restricting surface 34a is configured as an inclined surface, the base side of the restricting part 34 becomes larger than the distal end side, so that it is resistant to vibration.

Next, a lower end 53a of the extension part 53 provided on the lower portion side of the bracket 50 is brought close to the attachment partner, and the lower end 53a is fixed to the lamp housing 20 (for example, fixed by the bolt N1 and see FIG. 2).

As described above, the bracket 50 is fixed to the outer lens 30 in a state where the protruding part 52 is inserted into the groove 33 (see the enlarged view in the circle C1 in FIG. 4), the extension part 53 (lower end 53a) is fixed to the lamp housing 20 (see FIG. 2), and the restricting part 34 is inserted into and fitted in the fitting recessed part 54 (See FIGS. 5 and 7). At this time, the protruding part 52 is fixed in a state of being biased (pressed) and locked to the first protruding part 33a (inner wall of the groove 33) on the front surface side (see an enlarged view in a circle C1 in FIG. 4). Further, the upper surface 54a of the fitting recessed part 54 comes into surface contact with the upper restricting surface 34a of the restricting part 34, and the lower surface 54b of the fitting recessed part 54 comes into surface contact with the lower restricting surface 34b of the restricting part 34 (see FIG. 5). As a result, the movement of the bracket 50 in the up-down direction is restricted. Further, the left surface 54c of the fitting recessed part 54 is in surface contact with the left restricting surface 34c of the restricting part 34, and the right surface 54d of the fitting recessed part 54 is in surface contact with the right restricting surface 34d of the restricting part 34 (see FIG. 7). As a result, the movement of the bracket 50 in the left-right direction is restricted. In addition, since not the entire restricting part 34 but only the distal end is inserted into and fitted to the fitting recessed part 54, a space S1 (see FIG. 7) is formed between the bracket 50 (bracket main body 51) and the outer lens 30 (bottom surface 32a of the recessed part 32). The space S1 functions as a drain passage through which rainwater, high-pressure washing water, and the like entering from the outside are discharged.

As described above, the movement of the bracket 50 in the up-down direction and the left-right direction is restricted in a state where the protruding part 52 is inserted into the groove 33 (see the enlarged view in the circle C1 in FIG. 4), the extension part 53 (lower end 53a) is fixed to the lamp housing 20 (see FIG. 2), and the restricting part 34 is inserted into and fitted to the fitting recessed part 54 (see FIGS. 5 and 7), so that the bracket 50 can be stably attached to the outer lens 30 (recessed part 32). As a result, even when vibration (vibration mainly during running of vehicle) is applied, a positional shift of the bracket 50 with respect to the outer lens 30 is less likely to occur, that is, a bracket attachment structure capable of suppressing an unintended movement of up, down, left, and right is realized.

The reason why the upper side (for example, the protruding part 52) of the bracket 50 (bracket main body 51) is not screwed to the outer lens 30 side is that it is difficult to secure a space for arranging the screw boss and the bracket fixing screw screwed thereto in the recessed part 32 of the outer lens 30.

Next, the radar cover 60 will be described.

The radar cover 60 (see FIG. 2 and the like) is detachably attached to the bracket 50 (bracket main body 51). For example, the radar cover 60 is detachably attached to the bracket 50 by causing a hook part 56 (See FIGS. 5 and 7) or the like provided on the bracket 50 to engage with the radar cover 60.

Next, the radar unit 70 will be described.

Figure 12:
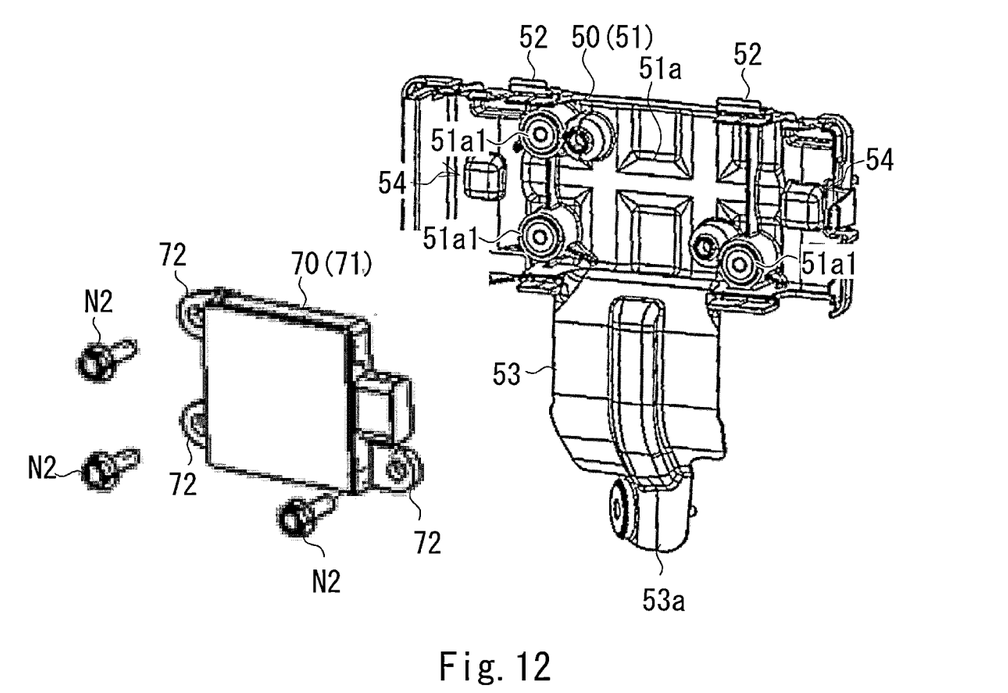
FIG. 12 is an exploded perspective view of the bracket 50 and a radar unit 70.

FIG. 12 is an exploded perspective view of the bracket 50 and the radar unit 70.

As illustrated in FIG. 12, the radar unit 70 (radar device) includes a case 71, a transmission antenna, a reception antenna (both not illustrated), and the like housed in the case 71. The radar unit 70 is a millimeter wave radar unit that transmits an electromagnetic wave (millimeter wave) from a transmission antenna. The electromagnetic wave (millimeter wave) transmits through the radar cover 60 and is transmitted within a range of a vertical divergence angle θv (see FIG. 6) and a horizontal divergence angle $θ_H$ (see FIG. 3). Then, the radar unit 70 receives, by the receiving antenna, the reflected wave reflected by the object present within the transmission range and transmitted through the radar cover 60. The received signal is subjected to signal processing by a control device, for example, an electronic control unit (ECU) not illustrated, and an object (distance, angle, speed from target object) is detected. In the radar unit 70, for example, a millimeter wave in a 76-81 GHz band, particularly, a millimeter wave in a 79 GHZ band is used, but the frequency band is not limited thereto.

Note that the radar method of the radar unit 70 may be any of a pulse method and a continuous wave (CW) method, or may be other methods. In addition, the antenna method of the radar unit 70 may be any of a mechanical scanning method, a beam switching method, a phased array method, and a digital forming method, or may be other methods.

The radar unit 70 having the above configuration is detachably attached to the bracket 50 (bracket main body 51). Specifically, as illustrated in FIG. 12, the radar unit 70 is attached to the bracket 50 (bracket main body 51) by screwing a screw N2 inserted into a flange part 72 of the radar unit 70 into a screw boss 51*a1* of the radar unit attachment surface 51*a* of the bracket 50 in a state where the rear surface and the radar unit attachment surface 51*a* of the bracket 50 face each other.

As described above, according to the present embodiment, it is possible to provide a bracket attachment structure in which the bracket 50 to which the radar unit 70 (and the radar cover 60) is attached is detachably attached to the outer lens 30 (the recessed part 32 recessed toward the lamp housing 20).

According to this bracket attachment structure, the protruding part 52 is inserted into the groove 33 (see an enlarged view in a circle C1 in FIG. 4), and the extension part 53 (lower end 53*a*) is fixed to the attachment partner (for example, the lamp housing 20), whereby the bracket 50 can be detachably attached to the outer lens 30 (the recessed part 32 recessed toward the lamp housing 20 side). At this time, the restricting part 34 is inserted and fitted into the fitting recessed part 54 (see FIGS. 5 and 7). As a result, since the movement of the bracket 50 in the up-down direction and left-right direction is restricted, the bracket 50 can be stably attached to the outer lens 30 (recessed part 32). As a result, even when vibration (vibration mainly during running of vehicle) is applied, a positional shift of the bracket 50 with respect to the outer lens 30 is less likely to occur, that is, a bracket attachment structure capable of suppressing an unintended movement of up, down, left, and right is realized.

Next, a modified example will be described.

In the above embodiment, an example has been described in which the groove 33 is formed in the inner wall 32*b* (upper inner wall 32*b*1) of the recessed part 32, and the protruding part 52 to be inserted into the groove 33 is provided on the upper side of the bracket main body 51, but the present invention is not limited thereto. For example, the groove 33 may be formed (not illustrated) in the inner wall 32*b* (inner inner wall 32*b*3) of the recessed part 32, and the protruding part 52 to be inserted into the groove 33 may be provided on the bracket main body 51 at an inner side in the vehicle width direction.

In the above embodiment, an example has been described in which the restricting part 34 protruding toward the bracket 50 is provided on the bottom surface 32*a* of the recessed part 32 of the outer lens 30, and the fitting recessed part 54 into which the restricting part 34 is inserted and fitted is provided in the bracket main body 51, but the present invention is not limited thereto. Although not illustrated, conversely, the bracket main body 51 may be provided with the restricting part 34 protruding toward the outer lens 30 (the bottom surface 32*a* of the recessed part 32), and the fitting recessed part 54 into which the restricting part 34 is inserted and fitted may be provided on the bottom surface 32*a* of the recessed part 32 of the outer lens 30.

In the above embodiment, an example has been described in which the groove 33 (an example of the engaged part in the present disclosure) is provided on the inner wall 32*b* (the upper inner wall 32*b*1) of the recessed part 32, and the protruding part 52 (an example of the engaging part in the present disclosure) to be inserted (engaged) into the groove 33 is provided on one end side of the bracket main body 51, but the present disclosure is not limited thereto. Although not illustrated, conversely, the protruding part 52 (an example of the engaging part of the present disclosure) may be provided on the inner wall 32*b* (the upper inner wall 32*b*1) of the recessed part 32, and the groove 33 (an example of the engaged part of the present disclosure) into which the protruding part 52 is inserted (engaged) may be provided on one end side of the bracket main body 51.

In the above embodiment, an example has been described in which the restricting part 34 is provided at two locations (see FIGS. 7 and 8) of the bottom surface 32*a* of the recessed part 32 of the outer lens 30, and the fitting recessed parts 54 into which the restricting part 34 is inserted and fitted are provided at two locations (see FIG. 7) of the bracket main body 51, but the present invention is not limited thereto. Although not illustrated, the restricting part 34 may be provided at one or three or more locations on the bottom surface 32*a* of the recessed part 32 of the outer lens 30, and the fitting recessed part 54 into which the restricting part 34 is inserted and fitted may be provided at one or three or more locations on the bracket main body 51.

Each numerical value illustrated in each of the above embodiments is an example, and it is a matter of course that an appropriate numerical value different from this can be used.

Each of the above embodiments is merely an example in all respects. The present disclosure is not to be construed as being limited by the description of each of the above embodiments. The present disclosure can be implemented in various other forms without departing from the spirit or main characteristics thereof.

From the disclosure thus described, it will be obvious that the embodiments of the disclosure may be varied in many ways. Such variations are not to be regarded as a departure from the spirit and scope of the disclosure, and all such modifications as would be obvious to one skilled in the art are intended for inclusion within the scope of the following claims.

What is claimed is:

1. A bracket attachment structure that detachably attaches a bracket to an outer lens that is attached to a lamp housing and constitutes a lamp chamber in which a lamp unit is disposed between the outer lens and the lamp housing, wherein
the outer lens includes a recessed part recessed toward the lamp housing side,
the bracket includes: a bracket main body including a front surface to which a radar unit is detachably attached and a rear surface on a side opposite to the front surface, the bracket main body being disposed in the recessed part in a state where the rear surface and a bottom surface of the recessed part face each other; and an extension part extending from an other end side on a side opposite to one end side of the bracket main body to an outside of the recessed part and detachably fixed to an attachment partner,
an engaged part is provided in one of an inner wall of the recessed part and the one end side of the bracket main body,
an engaging part that engages with the engaged part is provided in the other of the inner wall of the recessed part and the one end side of the bracket main body,
one of a bottom surface of the recessed part of the outer lens and the bracket main body is provided with a restricting part protruding toward the other,
a fitting recessed part into which the restricting part is inserted and fitted is provided in the other of the bottom surface of the recessed part of the outer lens and the bracket main body, and
the bracket is fixed to the outer lens in a state where the engaging part is engaged with the engaged part, the extension part is fixed to the attachment partner, and the restricting part is inserted into and fitted in the fitting recessed part.

2. The bracket attachment structure according to claim 1, wherein
the restricting part includes a pair of upper restricting surface and lower restricting surface,
the fitting recessed part includes an upper surface in surface contact with the upper restricting surface and a lower surface in surface contact with the lower restricting surface, and
the bracket is restricted from moving in an up-down direction by bringing the upper surface of the fitting recessed part into surface contact with the upper restricting surface of the restricting part and bringing the lower surface of the fitting recessed part into surface contact with the lower restricting surface of the restricting part, in a state where the restricting part is inserted and fitted into the fitting recessed part.

3. The bracket attachment structure according to claim 2, wherein
the restricting part further includes a pair of left restricting surface and right restricting surface,
the fitting recessed part further includes a left surface in surface contact with the left restricting surface and a right surface in surface contact with the right restricting surface, and
the bracket is restricted from moving in a left-right direction by bringing the left surface of the fitting recessed part into surface contact with the left restricting surface of the restricting part and bringing the right surface of the fitting recessed part into surface contact with the right restricting surface of the restricting part in a state where the restricting part is inserted and fitted into the fitting recessed part.

4. The bracket attachment structure according to claim 1, wherein the restricting part is inserted into the fitting recessed part and fitted into the fitting recessed part by the engaging part engaging with the engaged part and the bracket rotating toward the outer lens with the engaged engaging part used as a fulcrum.

5. The bracket attachment structure according to claim 4, wherein either of the upper restricting surface and the lower restricting surface, whichever is a surface close to the engaging part, is configured as an inclined surface so as to be easily inserted into the fitting recessed part during the rotation of the bracket.

6. The bracket attachment structure according to claim 1, wherein
the engaged part is a groove, and
the engaging part is a protruding part to be inserted into the groove.

* * * * *